United States Patent
Wei et al.

(10) Patent No.: US 8,289,981 B1
(45) Date of Patent: Oct. 16, 2012

(54) APPARATUS AND METHOD FOR HIGH-PERFORMANCE NETWORK CONTENT PROCESSING

(75) Inventors: Shaohong Wei, Sunnyvale, CA (US); Viswa Soubramanien, Santa Clara, CA (US)

(73) Assignee: Trend Micro Incorporated, Tokyo (JP)

( * ) Notice: Subject to any disclaimer, the term of this patent is extended or adjusted under 35 U.S.C. 154(b) by 274 days.

(21) Appl. No.: 12/432,193

(22) Filed: Apr. 29, 2009

(51) Int. Cl.
*H04L 12/28* (2006.01)
*H04L 12/56* (2006.01)

(52) U.S. Cl. ........................................ 370/401
(58) Field of Classification Search .................. None
See application file for complete search history.

(56) References Cited

U.S. PATENT DOCUMENTS

| | | | | |
|---|---|---|---|---|
| 5,544,162 A * | 8/1996 | Mraz et al. | ...... | 370/401 |
| 5,822,785 A * | 10/1998 | Ikeda et al. | ...... | 711/209 |
| 6,115,393 A * | 9/2000 | Engel et al. | ...... | 370/469 |
| 6,611,875 B1 * | 8/2003 | Chopra et al. | ...... | 709/245 |
| 7,058,821 B1 * | 6/2006 | Parekh et al. | ...... | 713/194 |
| 7,088,677 B1 * | 8/2006 | Burst, Jr. | ...... | 370/229 |
| 7,200,721 B1 * | 4/2007 | Lang et al. | ...... | 711/141 |
| 7,440,446 B2 * | 10/2008 | Sim | ...... | 370/356 |
| 7,562,389 B1 * | 7/2009 | Goyal et al. | ...... | 726/22 |
| 2004/0039939 A1 * | 2/2004 | Cox et al. | ...... | 713/201 |
| 2004/0109518 A1 | 6/2004 | Miller et al. | | |
| 2005/0102560 A1 * | 5/2005 | Taketoshi et al. | ...... | 714/14 |
| 2005/0159181 A1 * | 7/2005 | Gadgil et al. | ...... | 455/554.2 |
| 2006/0020356 A1 * | 1/2006 | Kano | ...... | 700/94 |
| 2006/0023709 A1 * | 2/2006 | Hall et al. | ...... | 370/389 |
| 2006/0253903 A1 * | 11/2006 | Krumel | ...... | 726/13 |
| 2006/0272006 A1 * | 11/2006 | Wei et al. | ...... | 726/2 |
| 2007/0011429 A1 * | 1/2007 | Sangili et al. | ...... | 711/203 |
| 2007/0053382 A1 | 3/2007 | Bevan et al. | | |
| 2007/0083870 A1 * | 4/2007 | Kanakogi | ...... | 718/105 |
| 2007/0156919 A1 * | 7/2007 | Potti et al. | ...... | 709/238 |
| 2007/0171924 A1 * | 7/2007 | Eisner et al. | ...... | 370/401 |
| 2007/0198980 A1 * | 8/2007 | Kwon | ...... | 718/100 |
| 2008/0052774 A1 * | 2/2008 | Chesla et al. | ...... | 726/13 |
| 2009/0178060 A1 * | 7/2009 | Winter et al. | ...... | 719/318 |
| 2009/0279438 A1 * | 11/2009 | Mackey et al. | ...... | 370/241 |
| 2010/0098092 A1 * | 4/2010 | Luo et al. | ...... | 370/401 |

OTHER PUBLICATIONS

Magic Quadrant for Secure Web Gateway, Gartner [webpage][online],Sep. 11, 2008, pp. 1-18 [retrieved on Jul. 8, 2009]. Retrieved from the internet: http://mediaproducts.gartner.com/reprints/securecomputing/160130.html.

* cited by examiner

*Primary Examiner* — Ayaz Sheikh
*Assistant Examiner* — Peter Chau
(74) *Attorney, Agent, or Firm* — Okamoto & Benedicto LLP

(57) ABSTRACT

One embodiment relates to a network gateway apparatus configured for high-performance network content processing. The apparatus includes data storage configured to store computer-readable code and data, and a processor configured to execute computer-readable code and to access said data storage. Computer-readable code implements a plurality of packet processors, each packet processor being configured with different processing logic. Computer-readable code further implements a packet handler which is configured to send incoming packets in parallel to the plurality of packet processors. Another embodiment relates to a method for high-performance network content processing. Other embodiments, aspects and features are also disclosed.

11 Claims, 5 Drawing Sheets

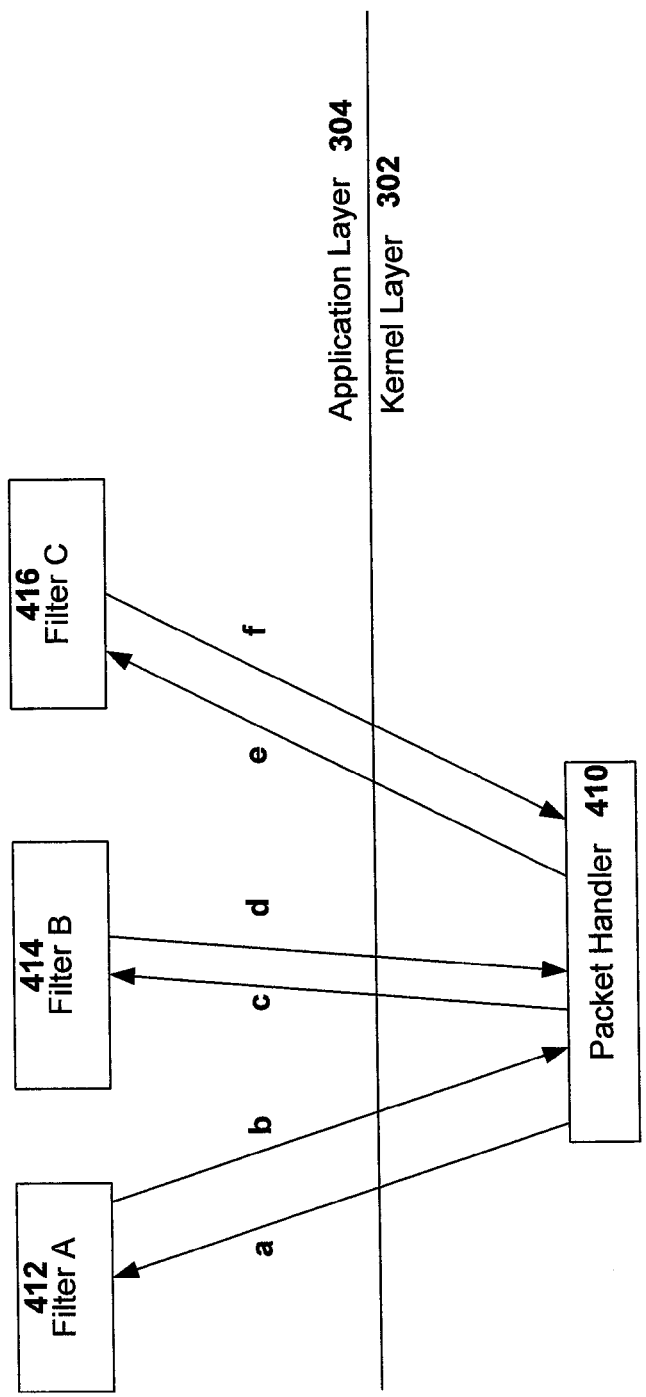
FIG. 4
(Conventional)

APPARATUS AND METHOD FOR HIGH-PERFORMANCE NETWORK CONTENT PROCESSING

BACKGROUND

1. Field of Art

The present invention generally relates to the field of networking and, more particularly, to the processing or filtering of network traffic.

2. Description of the Related Art

Organizations, such as companies and institutions, have come to increasingly rely on their internal and external networks for information dissemination, service delivery, communications, and data storage, for example. Organizations have become particularly vulnerable to disruptions to both internal and external network services. Such disruptions may occur from, for example, malicious code such as computer viruses that may be transmitted via email or other file transfers from an external network. Organizations may also need to protect sensitive information in their internal network from access by unauthorized users. In addition, organizations have to deal with an ever increasing number of communication and file transfer services, such as instant messaging and peer-to-peer file sharing. The use of such services by employees of an organization may expand to occupy a substantial portion of available bandwidth in the organization's network.

There is thus a desire to exercise some control over such traffic in both internal and external networks. For example, an organization's policy may dictate that all instant messaging and peer-to-peer traffic between any computer on the organization's network and any computer outside the organization's network must be subject to one or more policy rules. Such policy rules may include completely blocking access to certain applications. There may also be a need to monitor and control work-related communications and other data transfers, which may inadvertently subject the internal organization's network to viruses, intrusion attempts or other unauthorized uses. In other cases, it may be desired to provide traffic shaping with respect to network traffic in order to optimize or guarantee performance, reduce latencies, and/or increase the usable network bandwidth. It may also be desired to provide quality of service (QoS) to provide different priorities to various applications, users or data flows and/or guarantee performance levels for specified data flows.

While such monitoring and controlling of traffic is in many instances highly desirable, such processes may require the provision of additional computer resources. Depending on the organization's network management policies, the monitoring and controlling of data transfers may place a substantial overhead on the operation of the network and may result in unacceptable delays in transferring data from internal to external networks, particularly where there are a large number of network management policies in place.

SUMMARY

One embodiment relates to a network gateway apparatus configured for high-performance network content processing. The apparatus includes data storage configured to store computer-readable instructions and data, and a computer processor configured to execute computer-readable instructions and to access said data storage. Computer-readable code in the apparatus implements a plurality of packet processors, each packet processor being configured with different processing logic. Computer-readable code in the apparatus further implements a packet handler which is configured to send incoming packets in parallel to the plurality of packet processors.

Another embodiment relates to a computer-implemented method for high-performance network content processing. A packet processor registration table is accessed to determine a plurality of packet processors to be applied and whether each packet processor to be applied is to be run in an inline mode or a promiscuous mode. An incoming packet is sent to the plurality of packet processors to be applied. Processing logic is applied in parallel by the plurality of packet processors.

Another embodiment relates to a network gateway. The gateway includes at least a packet handler, a plurality of packet processors, and packet processor registration data structure. The packet handler receives incoming packets. The packet processor registration data structure is configured to be accessed by the packet handler so as to determine a plurality of packet processors to be applied and whether each packet processor to be applied is to be run in an inline mode or a promiscuous mode. The packet handler is configured to send an incoming packet to the packet processors to be applied so that their processing logic is applied in parallel.

Other embodiments, aspects and features are also disclosed.

BRIEF DESCRIPTION OF DRAWINGS

The disclosed embodiments have other advantages and features which will be more readily apparent from the following detailed description and the appended claims, when taken in conjunction with the accompanying drawings, in which:

FIG. 4 is a schematic diagram showing select software components in the virtual memory space of a computer apparatus configured for conventional packet filtering.

DETAILED DESCRIPTION

Applicants have determined that prior technologies to filter or process network traffic have certain disadvantages and inefficiencies. The present application discloses an apparatus and method for high-performance network content processing. Advantageously, this method and apparatus enables multiple packet processors to receive and apply their processing logic (or scan) a packet in parallel which leads to high-performance packet processing in accordance with an embodiment of the invention.

Figure 1:
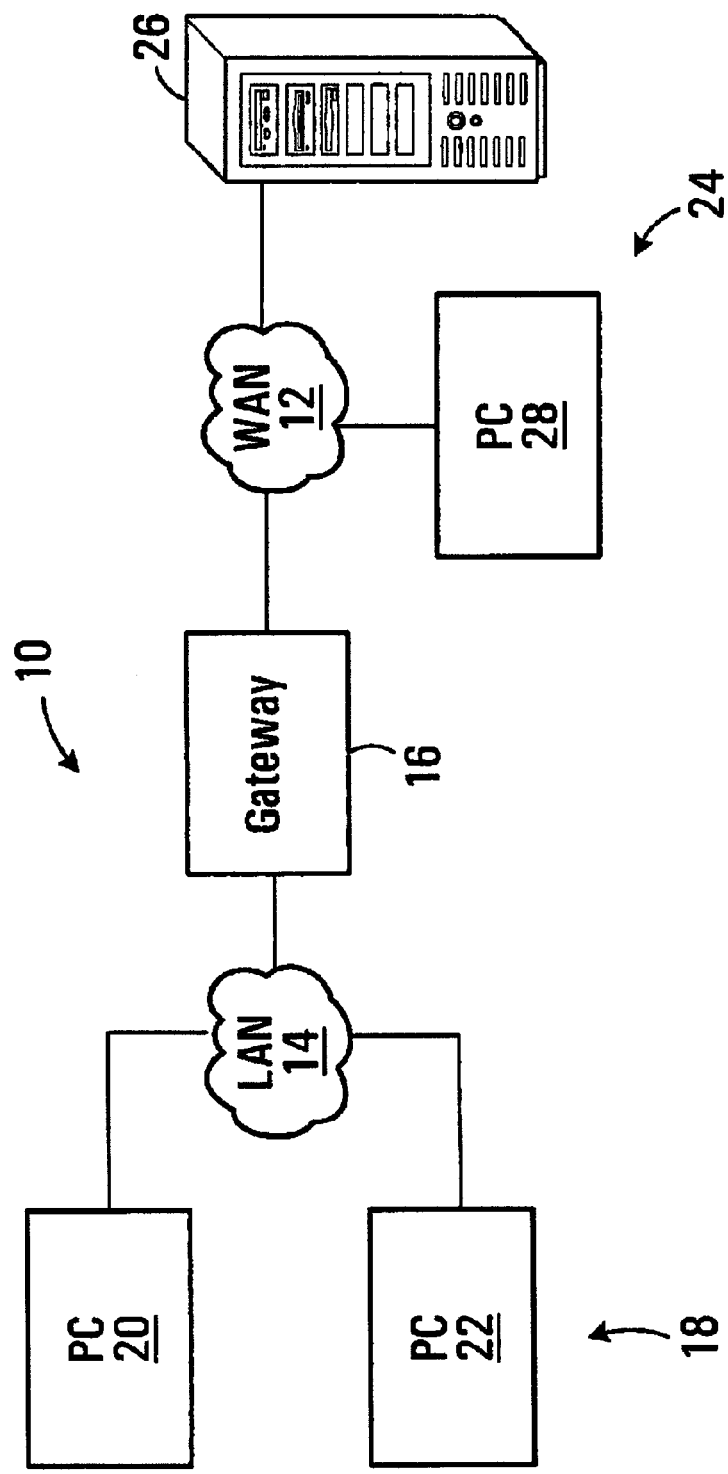
FIG. 1 is a schematic diagram depicting a data communication system in which an embodiment of the invention may be utilized.

Referring to FIG. 1, a data communication system according to a first embodiment of the invention is shown generally at 10. The system includes a Wide Area Network 12 (WAN), such as an intranet or Internet, a Local Area Network (LAN) 14, and a gateway 16 connecting the WAN to the LAN. The LAN 14 includes a plurality of nodes shown generally at 18, which may include networked devices such as personal computers 20 and 22, but may also include, for example, other devices such as server computers, routers, wireless access points, input devices, and output devices. The WAN 12 also includes a plurality of nodes shown generally at 24, which may include a server 26 and a personal computer 28. The server 26 may be an Instant Messaging (IM) mediation server that facilitates an instant messaging data transfer between personal computers 20 and 22 and the personal computer 28. Alternatively the server may be a computer running a program that receives and processes requests for information from other nodes connected directly to the WAN, such as the personal computer 28, or nodes connected to the WAN through the gateway 16 and the LAN 14, such as personal computers 20 and 22.

Generally the above components cooperate to manage a transfer of data between a first node and a second node in a data network by identifying data associated with a communication session between the first node and the second node and further processing the communication session when a portion of the communication session meets a criterion or permitting the communication session to continue when the portion of the communication session does not meet the criterion.

In one embodiment the transfer of data may include file or message data that has been formatted into one or more data packets. Each data packet includes a header portion and a data portion. The header portion includes fields including information related to the source and/or destination of the data packet. The data portion of the data packet includes the file or message data. If the file or message data is too large to be transmitted in a single packet, it may be split up over several packets, in which case the header portion may also include information related to the sequence of the data packets thus facilitating correct re-assembly of the file or message data at the destination.

Figure 2:
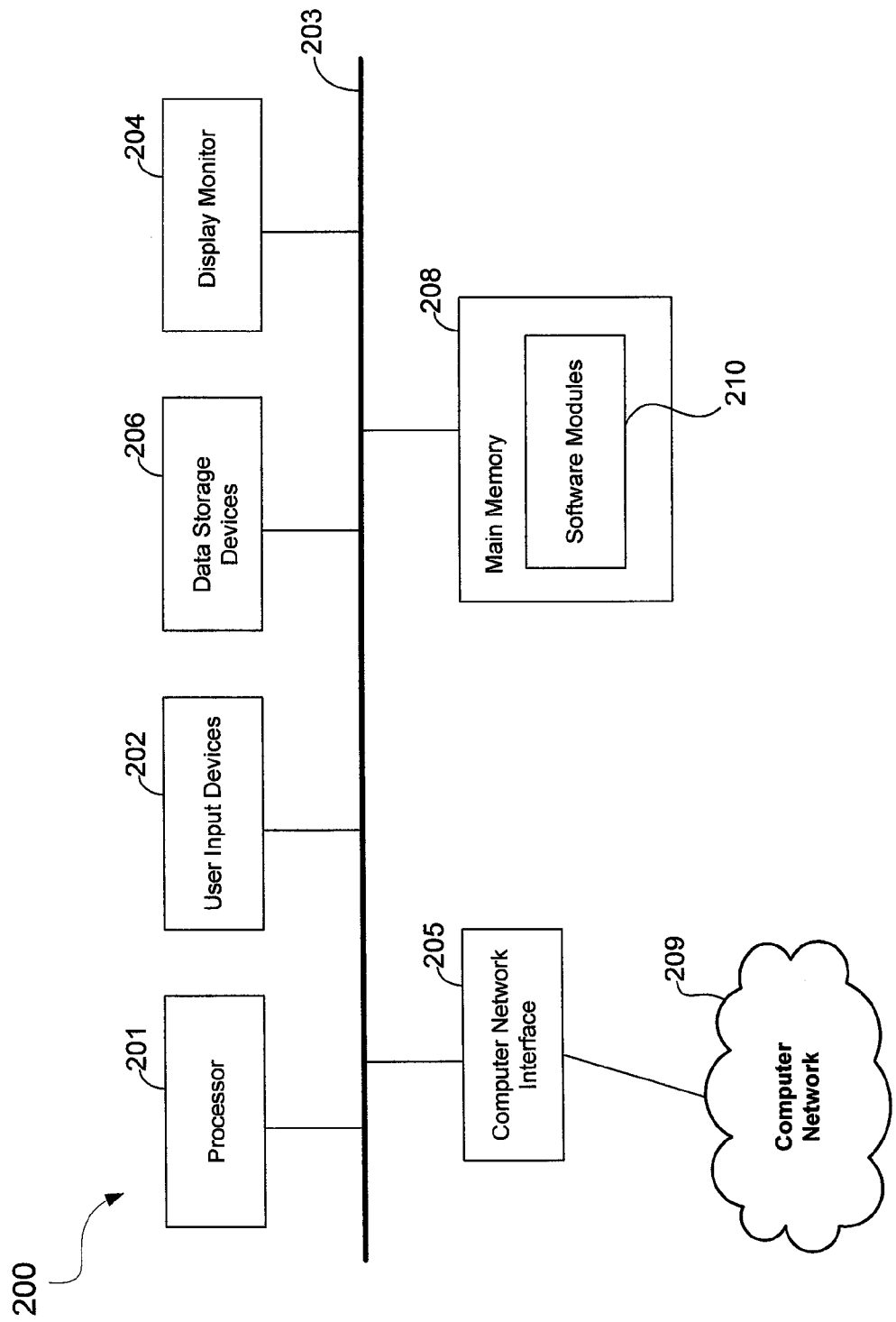
FIG. 2 is a schematic diagram depicting a computer apparatus which may be configured for the implementation of high-performance network content processing in accordance with an embodiment of the invention.

Referring now to FIG. 2, there is shown a schematic diagram of a computer apparatus 200 in accordance with an embodiment of the present invention. The computer apparatus 200 may be employed as a gateway 16, or server 26. or personal computer (20, 22, 28), for example. The computer 200 may have less or more components to meet the needs of a particular application. The computer 200 may include a processor 201, such as those from the Intel Corporation of Santa Clara, Calif., or Advanced Micro Devices of Sunnyvale, Calif., for example. The computer 200 may have one or more buses 203 coupling its various components. The computer 200 may include one or more user input devices 202 (e.g., keyboard, mouse), one or more data storage devices 206 (e.g., hard drive, optical disk, USB memory), a display monitor 204 (e.g., LCD, flat panel monitor, CRT), a computer network interface 205 (e.g., network adapter, modem), and a main memory 208 (e.g., RAM). The computer network interface 205 may be coupled to one or more computer networks 209, which in this example may be a LAN 14 and/or a WAN 12.

In the example of FIG. 2, the main memory 208 includes software modules 210. The software modules 210 may comprise computer-readable program code (i.e., software) components of a gateway 16, or server 26. or personal computer (20, 22, 28), for example. The software modules 210 may be loaded from the data storage device 206 to the main memory 208 for execution by the processor 201.

Figure 3:
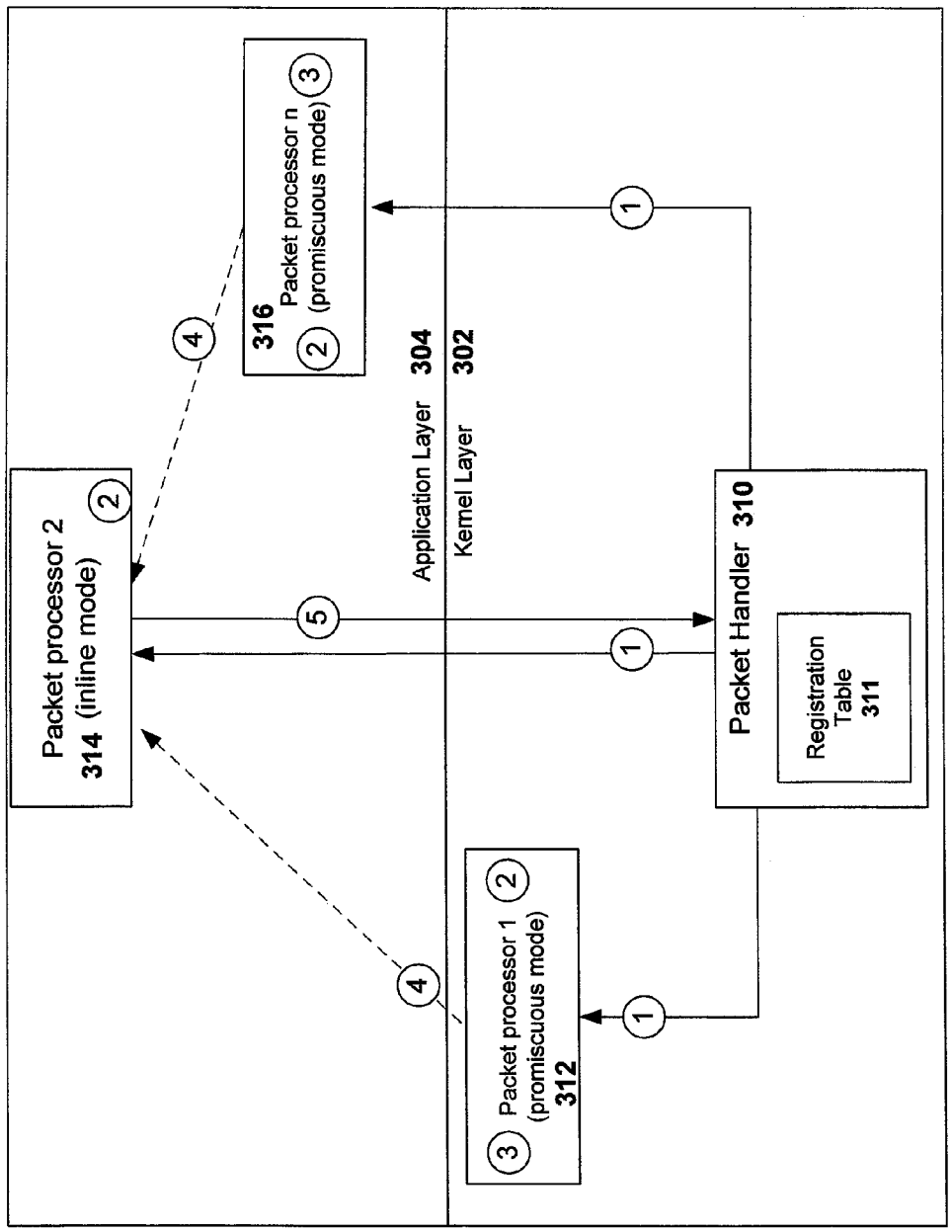
FIG. 3 is a schematic diagram depicting select software components in the virtual memory space of a computer apparatus configured for high-performance network content processing in accordance with an embodiment of the invention.

FIG. 3 is a schematic diagram depicting select software components in the virtual memory space of a network gateway apparatus configured for high-performance network content processing in accordance with an embodiment of the invention. Interactions between the components are also shown.

As seen, the virtual memory space is divided into a kernel layer (space) 302 and an application layer (space) 304. The kernel layer 302 is generally reserved for running the operating system's kernel, kernel extensions, and device drivers. The application layer 304 is generally used for running user-mode applications. The kernel generally makes system resources (such as memory, processors, and input/output devices) available to application processes by way of system calls and inter-process communications.

In the embodiment shown in FIG. 3, the software components include a packet handler 310 and various packet processors. The packet handler 310 runs in kernel space, while the packet processors may run in either kernel space or application space. This specific example includes Packet processor 1 312, Packet processor 2 314, and Packet processor n 316, but it is contemplated that any number of packet processors may be used. Further, in this example, Packet processor 1 312 runs in kernel space, while Packet processor 2 314 and Packet processor n 316 run in application space.

In accordance with an embodiment of the invention, the packet handler 306 is configured to receive and process incoming packets received by the gateway 16. The packet handler 306 is further configured to send (1) the incoming packets in parallel to a plurality of packet processors that are registered with the packet handler 310. A packet processor registration table 311 may be used by the packet handler 310 to store and access the packet processor registration information.

In accordance with an embodiment of the invention, the packet processor registration table 311 includes an entry for each connection or session being processed or filtered. Each entry may indicate which of a plurality of registered packet processors are to be applied to packets for that connection or session. Each entry may further indicate whether the packet processors are to be applied in a "promiscuous" ("offline") mode or an "inline" mode. In accordance with an embodiment of the invention, at least one of the packet processors is to be applied in an inline mode, and at least one of the packet processors is to be applied in a promiscuous (offline) mode. A packet processor may be used in inline mode for one session and in promiscuous mode for another session. The coordination of the various packet processors in either inline mode or promiscuous mode is controlled or arbitrated by the packet handler 310 using the registration table 311.

The individual packet processors are each configured to apply processing logic (or scan) (2) the packet for security, monitoring, or other purposes. The capability of the packet processors to receive and apply their processing logic (or scan) a packet in parallel is an advantageous aspect which leads to high-performance network content processing in accordance with an embodiment of the invention.

In contrast, conventional apparatus generally apply processing logic for each packet processor in a chained sequence. Applicants believe that conventional apparatus are generally designed this way to strictly control "ownership" of the packet and avoid the need to coordinate between the processing logic of the various packet processors. The innovative apparatus and method disclosed herein provides for the efficiency of parallel application of processing logic while still effectively maintaining a requisite level of control over the packet.

As mentioned above, in accordance with an embodiment of the invention, at least one of the packet processors (in this example, Packet processor 2 314) runs (applies its processing logic) in an "inline" mode, while the other packet processors (in this example, Packet processor 1 312 and Packet processor n 316) run (apply their processing logic) in a "promiscuous" or "offline" mode. The promiscuous mode packet processors apply their logic in parallel along with a first inline packet processor, while the first inline mode packet processor maintains ownership of the packet.

The promiscuous mode packet processors may perform an action by itself (3), such as injecting a transmission control protocol (TCP) reset or Internet control message protocol (ICMP) message. The promiscuous mode packet processors may also pass on the action (4) to the inline packet processor so that the action may be performed, if appropriate, by the inline packet processor.

The inline mode packet processor performs actions (5) from the promiscuous mode packet processors and/or from itself. The actions (5) taken by the inline mode packet processor may comprise, for example, ignoring all packets in a TCP connection, resetting a TCP connection, sending an ICMP message, sending application layer error codes (for example, HTTP error code 403), or other appropriate actions.

The packet processors discussed above include packet filters, such as firewalls and anti-malware filters, and more generally other packet processors. These other packet processors may include document leakage prevention scanners, intrusion detectors, traffic classifiers, quality of service (QoS) managers, and traffic shapers.

In one embodiment of the invention, the packet processors which are applied are heterogeneous in that they are different types of packet processors. For example, one packet processor may by an antivirus scanner, another packet processor may be a document leakage prevention scanner, and another packet processor may be a traffic classifier. Other types of packet processors may also be used, including, for example, an intrusion detector, a quality of service (QOS) managing device, and/or a traffic shaping device. In another embodiment, the packet processors which are applied may be homogeneous in that they are the same type of packet processor. For example, multiple traffic classifiers may be employed.

In accordance with an embodiment of the invention, an arbitration scheme may be applied for action from the inline processor. In one implementation, when an offline processor is registered, action-related information may be included in the registration table 311. For example, the action-related information may indicate that the inline processor is to either wait or not wait for an action decision from the offline processor before forwarding the packet. If the inline processor is not to wait for the action decision from the offline processor, then the offline processor may be taking action on its own or not taking any action. Hence, the inline processor may be configured to forward the packet only after waiting for action decisions from select offline processors (i.e. those offline processors whose action-related information indicates that the inline processor is to wait).

FIG. 4 is a schematic diagram showing select software components in the virtual memory space of a computer apparatus configured for conventional packet filtering. Interactions between the components are also shown.

In this conventional configuration, the packet handler 410 sends an incoming packet to each filter in sequence. In the example shown, the packet handler 410 first sends (a) the packet to Filter A 412 for application of its filtering logic, and subsequently Filter A 412 completes its actions (b). Next, the packet handler 410 sends (c) the packet to Filter B 414 for application of its filtering logic, and Filter B 414 subsequently completes its actions (d). Next, the packet handler 410 sends (e) the packet to Filter C 416 for application of its filtering logic, and Filter C 416 completes its actions (f). In this way, each of the multiple filters is applied serially in an inline manner.

Figure 5:
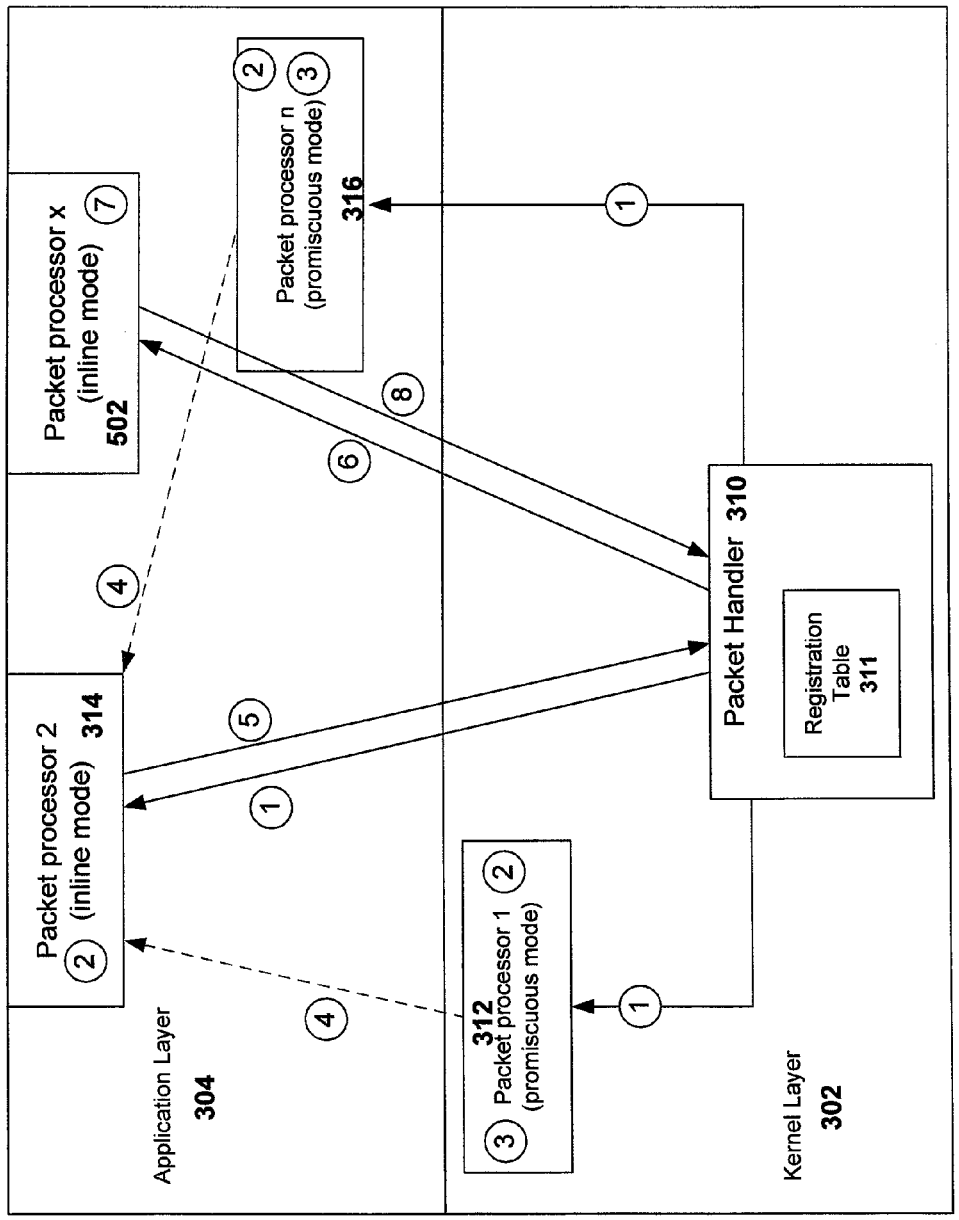
FIG. 5 is a schematic diagram depicting select software components in the virtual memory space of a computer apparatus configured for high-performance network content processing in accordance with another embodiment of the invention.

FIG. 5 is a schematic diagram depicting select software components in the virtual memory space of a computer apparatus configured for high-performance network content processing in accordance with another embodiment of the invention. Interactions between the components are also shown.

The difference between FIG. 5 and FIG. 3 is that there are multiple inline packet processors in FIG. 5. In this particular example, the additional packet processor running in inline mode is Packet processor x 502 which is configured to be applied sequentially after Packet processor 2 314 which is the first packet processor running in inline mode. "Ownership" (control without interference from other packet processors) of the packet is sequentially transferred from the first inline processor, to the next inline processor, and so forth until the end of the sequence of inline processors.

In the particular implementation shown, if there is no block or drop action which is taken (5) by the Packet processor 2 314 (requested by either itself, or one of the offline processors), then the packet handler 310 sends (6) the packet to Packet processor x 502 sequentially after Packet processor 2 314 completes its actions. Thereafter, Packet processor x 502 applies its processing logic (7) and completes its actions (8). After Packet processor x 502 performs its actions (8), then "ownership" of the packet is given to a next inline packet processor, if any, until the network content processing is finished.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Upon reading this disclosure, those of skill in the art will appreciate still additional alternative structural and functional designs for a system and a process for a matching engine to query relevant documents, which may include a signature generation and relevance detection through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A network gateway apparatus configured for high-performance network content processing, the apparatus comprising:
    data storage configured to store computer-readable code and data;
    a processor configured to execute computer-readable code and to access said data storage;
    computer-readable code implementing a plurality of packet processors which are configured to execute in an application layer or a kernel layer of a virtual memory space, each packet processor being configured with different processing logic, wherein the plurality of packet processors are configured to apply their processing logic in parallel;
    computer-readable code implementing a packet handler which is configured to execute in the kernel layer and send incoming packets in parallel to the plurality of packet processors; and
    a packet processor registration table configured in the kernel layer and indicating which packet processors are to be applied and whether each packet processor to be applied is to be run in a promiscuous or an inline mode, wherein packet processors running in the promiscuous mode are configured to be capable of performing an action and passing on an action to a first packet processor running in the inline mode, and wherein the first packet processor running in the inline mode is configured to be capable of performing actions received from the packet processors running in the promiscuous mode and from itself.

2. The apparatus of claim 1, wherein a next packet processor running in the inline mode receives a packet after a previous packet processor running in the inline mode completes actions it was to perform on the packet.

3. The apparatus of claim 1, wherein the packet processor registration table indicates which packet processors are to be applied and whether each packet processor to be applied is to be run in a promiscuous or an inline mode on a per session basis.

4. A method for high-performance network content processing by a network gateway, the method comprising:
    a packet handler executing in a kernel layer of a virtual memory space accessing a packet processor registration table to determine a plurality of packet processors to be applied and whether each packet processor to be applied is to be run in an inline mode or a promiscuous mode;
    sending an incoming packet by the packet handler to the plurality of packet processors to be applied, wherein each packet processor executes in an application layer of the virtual memory space or the kernel layer of the virtual memory space;
    applying processing logic in parallel by the plurality of packet processors;
    passing an action to be performed from packet processors running in the promiscuous mode to a first inline packet processor running in the inline mode; and
    performing by the first inline packet processor actions received from the packet processors running in the promiscuous mode and from itself, wherein the packet processor registration table is configured in the kernel layer and indicating which packet processors are to be applied and whether each packet processor to be applied is to be run in a promiscuous or an inline mode.

5. The method of claim 4, wherein the packet processor registration table indicates which packet processors are to be applied and whether each packet processor to be applied is to be run in a promiscuous or an inline mode on a per session basis.

6. The method of claim 4, further comprising:
    a second inline packet processor running in the inline mode receiving the incoming packet after the first inline packet processor running in the inline mode completes the action.

7. The method of claim 6, wherein actions performed by the packet processors include resetting a transmission control protocol connection.

8. The method of claim 6, wherein actions performed by the packet processors include sending an Internet control message protocol message.

9. A network gateway comprising:
- a packet handler executing in a kernel layer of a virtual memory space which receives incoming packets;
- a plurality of packet processors executing in an application layer of the virtual memory space or the kernel space of the virtual memory space; and
- a packet processor registration data structure configured to be accessed by the packet handler,
- wherein the packet handler is configured to use the packet processor registration data structure to determine packet processors to be applied and whether each packet processor to be applied is to be run in an inline mode or a promiscuous mode,
- wherein the packet handler is further configured to send an incoming packet to the packet processors to be applied so that their processing logic is applied in parallel,
- wherein packet processors running in the promiscuous mode are configured to be capable of performing an action and passing on an action to a first packet processor running in the inline mode, and
- wherein the first packet processor running in the inline mode is configured to be capable of performing actions received from the packet processors running in the promiscuous mode and from itself, wherein the packet processor registration data structure is configured in the kernel layer and indicating which packet processors are to be applied and whether each packet processor to be applied is to be run in a promiscuous or an inline mode.

10. The gateway of claim 9, further comprising:
- a next packet processor running in the inline mode receiving a packet after a previous packet processor running in the inline mode completes actions it was to perform on the packet.

11. The gateway of claim 9, wherein packet processors to be applied includes at least two of an antivirus packet processor, a document leakage prevention packet processor, and a traffic classification packet processor.

\* \* \* \* \*